Aug. 15, 1967  J. A. PAULI ETAL  3,335,981
RETRACTABLE FRONT LANDING GEAR FOR CARGO AIRCRAFT
Filed May 31, 1966  5 Sheets-Sheet 1

INVENTORS.
JULIUS A. PAULI
FRANCIS A. SMITH
BY
George A. Sullivan
Agent

Aug. 15, 1967  J. A. PAULI ETAL  3,335,981
RETRACTABLE FRONT LANDING GEAR FOR CARGO AIRCRAFT
Filed May 31, 1966  5 Sheets-Sheet 2

INVENTORS.
JULIUS A. PAULI
FRANCIS A. SMITH
BY
George C. Sullivan
Agent

Aug. 15, 1967   J. A. PAULI ETAL   3,335,981
RETRACTABLE FRONT LANDING GEAR FOR CARGO AIRCRAFT
Filed May 31, 1966   5 Sheets-Sheet 3

INVENTORS.
JULIUS A. PAULI
FRANCIS A. SMITH
BY
*George C. Sullivan*
Agent

Aug. 15, 1967  J. A. PAULI ET AL  3,335,981
RETRACTABLE FRONT LANDING GEAR FOR CARGO AIRCRAFT
Filed May 31, 1966  5 Sheets-Sheet 4

INVENTORS.
JULIUS A. PAULI
FRANCIS A. SMITH
BY
Agent

INVENTORS.
JULIUS A. PAULI
FRANCIS A. SMITH
BY
Agent

United States Patent Office 3,335,981
Patented Aug. 15, 1967

3,335,981
RETRACTABLE FRONT LANDING GEAR FOR CARGO AIRCRAFT
Julius A. Pauli, Marietta, and Francis A. Smith, Atlanta, Ga., assignors to Lockheed Aircraft Corporation, Burbank, Calif.
Filed May 31, 1966, Ser. No. 553,735
6 Claims. (Cl. 244—102)

This invention relates broadly to aircraft landing gear and more particularly to a protractable and retractable front landing gear for cargo aircraft of the nose loading type and the mounting thereof to facilitate on-and-off loading of the aircraft without any attendant losses in efficiency of the gear in its normal functions.

The present invention contemplates, among other things, interference between the forward landing gear and the movable or removable fuselage structure of nose loading cargo aircraft. Ideally, the forward or nose landing gear is located on or symmetrically about the longitudinal center line of the fuselage at a point where it will support a predetermined proportion of the gross weight of the aircraft (something on the order of about six to eight percent). Where this ideal or optimum location of the gear coincides with the removable door and/or movable ramp facilitating on-and-off loading of cargo, special provisions must be made lest the mounting and operation of one interferes with that of the other.

At the same time, it is desirable that the total structure necessary to ensure support of the aircraft on the nose gear during landing impact and ground operations is held to a minimum size and weight. This is complicated by the necessary requirement that the nose gear be mounted for retraction during flight and also the on-and-off loading ramp be movable to satisfy various loading and unloading conditions, for example, ground, platform, and truck bed level.

The instant invention is therefore directed to the above and other problems involved in mounting the nose landing gear on such aircraft. To this end, it is herein proposed to so mount the nose gear on the ramp that it is independently protractable and retractable from and to the aircraft during take off and landing and coordinated for movement with the ramp when raised and lowered to serve at all times as a continuous support for the aircraft. Thus, no compromise in the location of the nose landing gear need be made and full advantage taken of the ideal or optimum location.

The proposed mounting and arrangement of the nose landing gear has the further advantage in that it lends itself to incorporation in those aircraft utilizing a common ramp/pressure door. Since present day cargo aircraft are required to be pressurized, the on-and-off loading ramp has been heretofore employed during flight as a pressure door defining the end of the cargo and passenger compartment. By mounting the nose gear as herein contemplated, structural cutouts giving rise to special sealing provisions to ensure pressurization are avoided and still installation of the gear at the desired location is permitted. Moreover, since the ramp/pressure door structure is employed to support the nose gear loads, the customary support structure therefor is eliminated.

Normally where the ramp/pressure door is used, some waste of interior space on the non-pressurized side thereof within the fuselage nose results. The present mounting and arrangement permits a reduction in such waste by using this space for storage of the nose gear when retracted in lieu of specially designed and constructed wells within the underside of the fuselage which constitutes the floor of the cargo compartment.

The above and other objects of the invention will become more apparent with the further and more specific disclosure that follows and in which the construction, combination and arrangement of parts are more fully described, claimed and illustrated in the accompanying drawings wherein:

Figure 1:
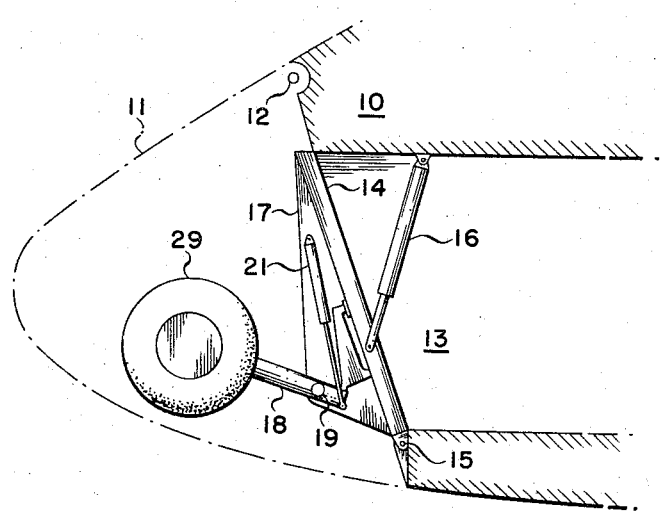
FIGURE 1 is a general schematic view from the side of the forward portion of an aircraft incorporating a front or nosewheel landing gear constructed and mounted in accordance with the teachings hereof to show the fully retracted position thereof during normal flight of the aircraft.
Figure 3:
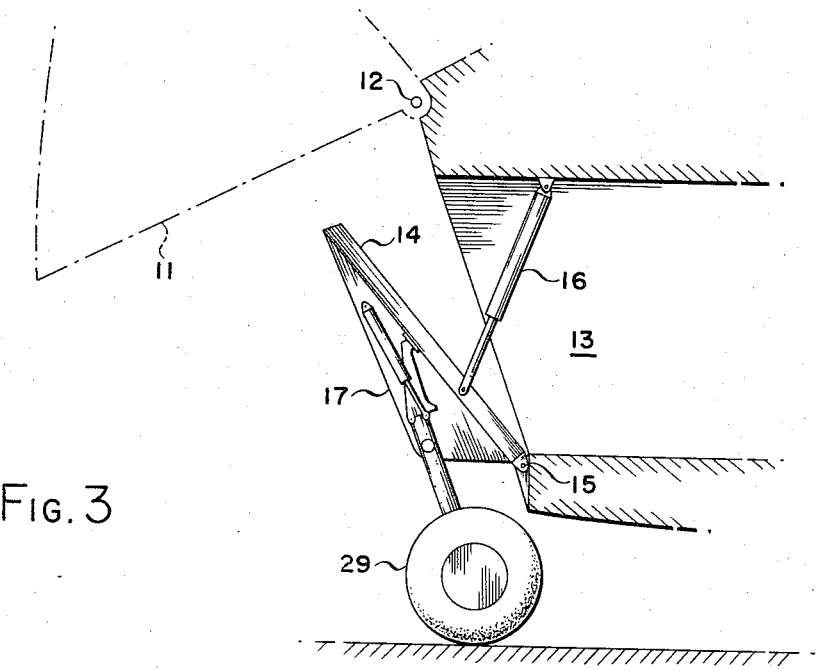
FIGURE 3 is a similar view showing the landing gear and ramp/pressure door moving as a unit to the on-and-off cargo loading position, the movable structure that closes the end of the aircraft during flight having been opened.
Figure 2:
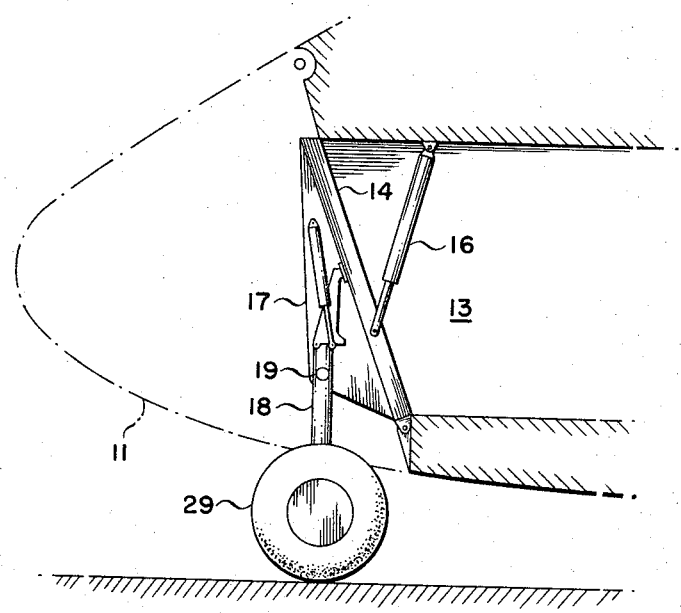
FIGURE 2 is a similar view to show the landing gear in the fully protracted position during take off and landing as well as ground taxiing of the aircraft.
Figure 4:
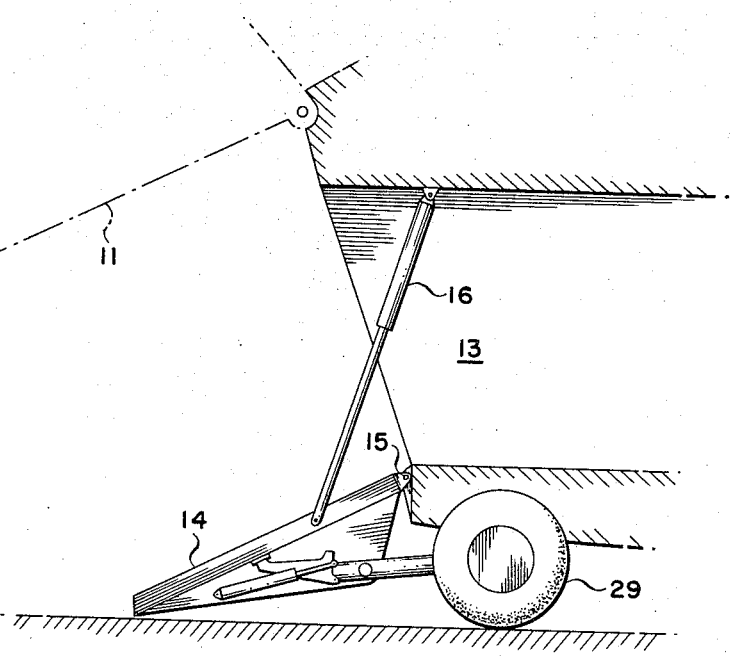
FIGURE 4 is a similar view after the landing gear and ramp/pressure door have moved to the extreme position for on-and-off cargo loading from ground level.
Figure 5:
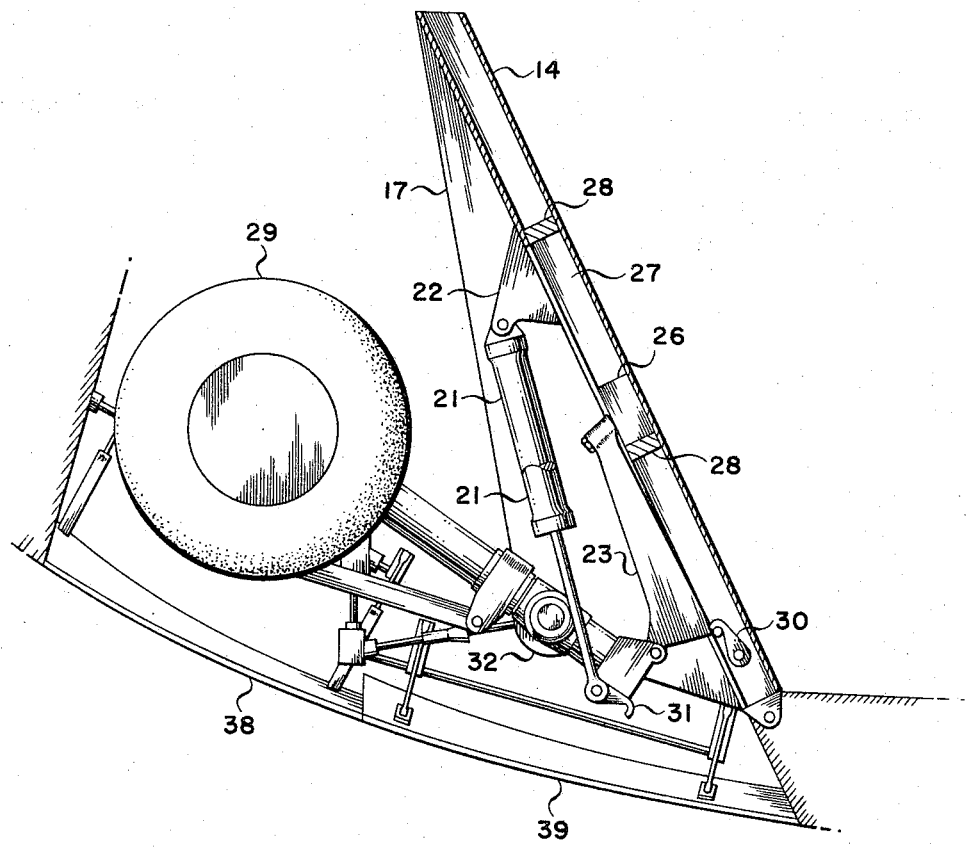
Figure 6:
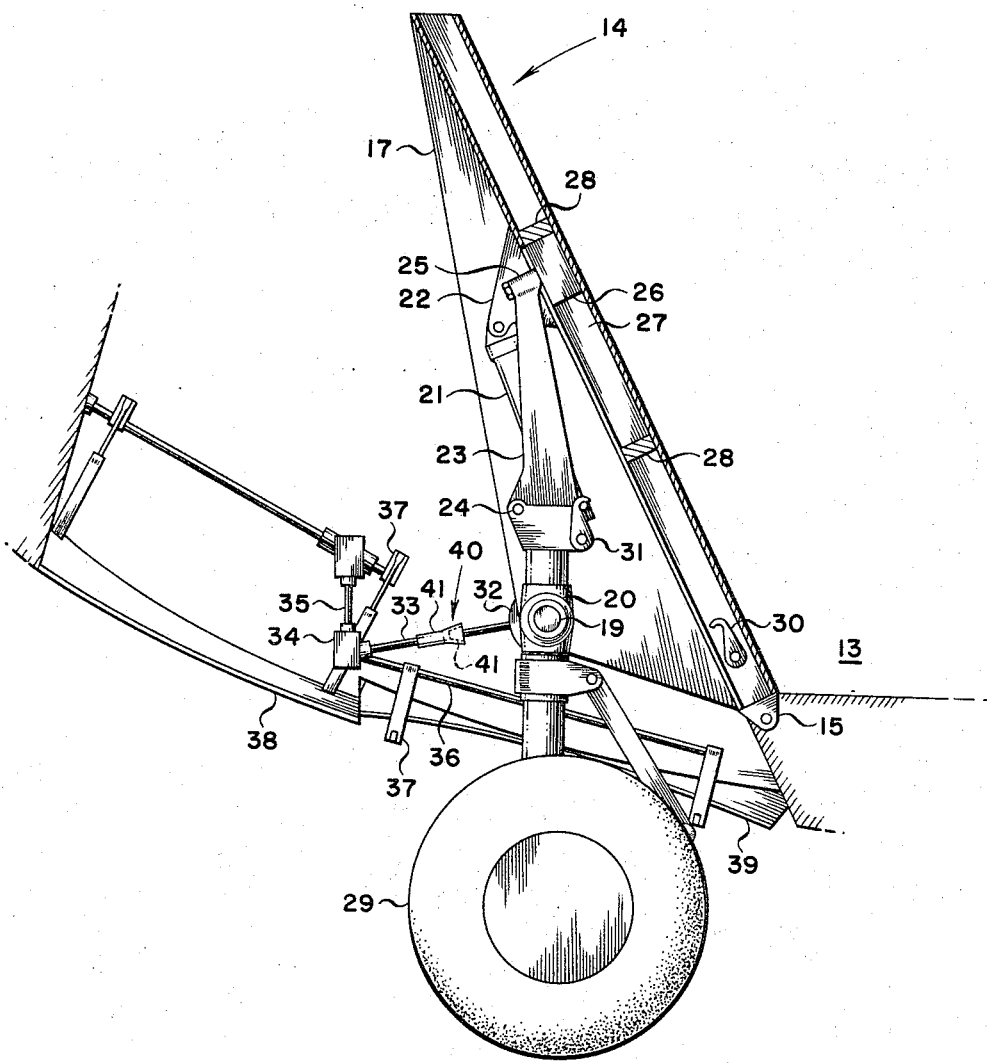
Figure 7:
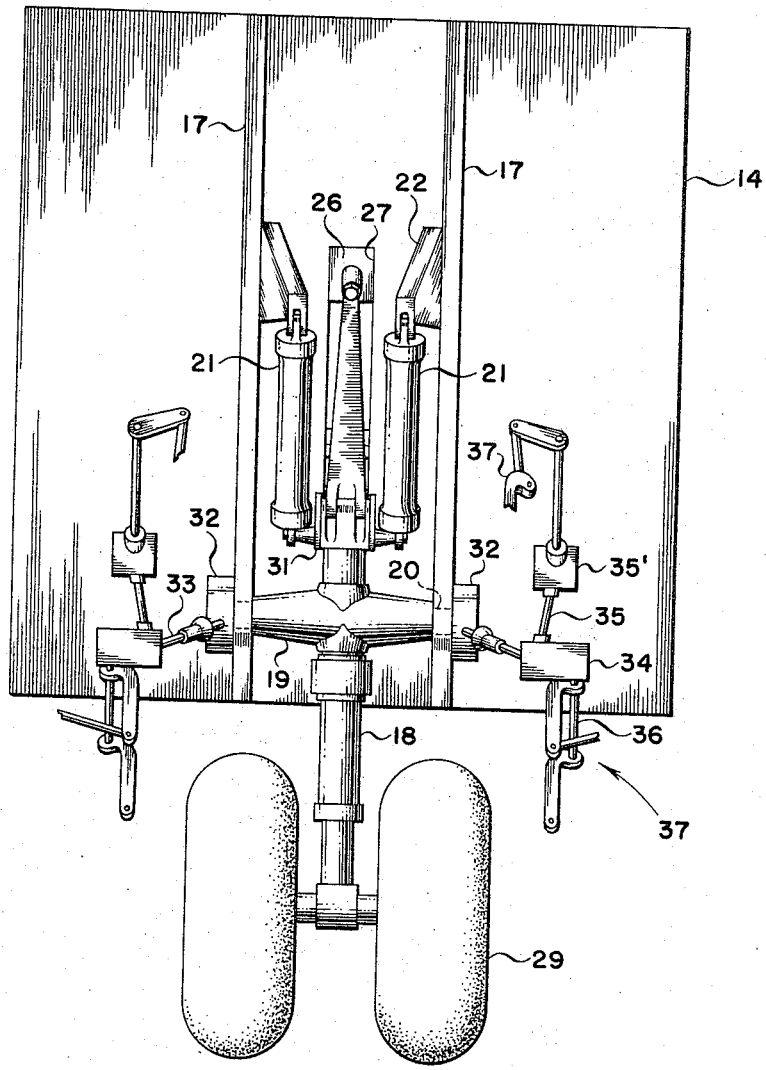

FIGURE 5 is an enlarged view like FIGURE 1 of the landing gear and ramp/pressure door to show in greater detail the structure and mounting thereof as well as the associated movable structure of the aircraft through which on-and-off loading is accomplished and two sets of doors closing the opening therein for the passage of the landing gear in moving to and from the protracted and retracted positions;

FIGURE 6 is a view similar to FIGURE 5 and corresponding to the position shown in FIGURE 2 wherein the aft set of doors is open to permit the full protraction of the landing gear while the forward set of doors is closed; and FIGURE 7 is an end elevation taken from the left of FIGURE 6 with both sets of doors removed to disclose the operating mechanism therefor.

Referring more particularly to the drawings, 10 designates a forward section of an aircraft having a removable end or nose 11 pivotally attached thereto, as at 12, for movement in a vertical plane. Internally of the aircraft 10 is a pressurized compartment 13 adapted to carry a payload and defined at its forward end by a pressure door 14 which closes and seals the compartment 13 during flight of the aircraft.

The door 14 is of lightweight structural design commonly employed in the construction of aircraft being capable of withstanding sufficient loads to serve as an on-and-off loading ramp during ground operations. For this purpose the door/ramp 14 is hinged, as at 15, at and along one of its sides to the floor or deck of the compartment 13. Suitable actuating means such as a power cylinder 16 connected between the door/ramp 14 and stationary aircraft structure is provided to swing the door/ramp 14 to and from positions opening and closing the compartment 13. when the nose 11 is raised by any conventional means to expose the interior of the aircraft, the door/ramp 14 may be swung by operation of the cylinder 16 to the desired angular position for on-and-off loading of the compartment 13 from and to ground level, truck bed, platform height, etc., as required.

On its exterior surface (with reference to the compartment 13) the door/ramp 14 is formed or otherwise provided with a pair of spaced projecting ribs 17 between which a conventional oleo strut 18 is pivotally connected through a trunnion beam 19. The opposite ends of the beam 19 are journalled in bosses 20 carried by the ribs 17 and the upper end of the strut 18 terminates beyond the beam 19 where it is connected to actuating means in the form of symmetrically disposed power cylinders 21 connecting it to aircraft structure through appropriate brackets 22. Upon operation of the cylinders 21, i.e., the extension and contraction thereof, the strut 18 swings about the beam 19 for retraction into and protraction out of the aircraft.

In the protracted or take off and landing and taxiing position the vertical loads acting on the strut 18 are directed into the door/ramp 14 through the ribs 17 and also through a rigid arm 23 forming a coaxially disposed extension of strut 18. To this end, the arm 23 is hinged, as at 24, to the strut 18 and pivotally mounted, as at 25, in a block or skid 26 slidably seated in a retaining track 27 carried by the door/ramp 14. Fixed stops 28 at opposite ends of the track 27 limit such movement of the skid 26 corresponding to extreme positions of retraction and protraction of the strut 18 and its ground contacting element or wheel 29 at the outer end thereof. Following conventional practice, an uplock 30 and downlock 31 is operatively associated with the strut 18, arm 23 and the adjacent structure of the door/ramp 14 and/or its ribs 17 to secure the strut 18 in its extreme positions.

A gear box 32 is mounted adjacent each end of the trunnion 19 for the connection thereto of a door-operating mechanism for the synchronized movement thereof to permit protraction and retraction of the landing gear when the nose section 11 is in the closed position. More specifically, this door-operating mechanism includes a shaft 33 connecting each gear box 32 to a second gear box 34 operatively connected between a pair of torque rods 35 and 36 for the rotation thereof in unison with rotation of the trunnion 19. The rods 35 and 36 are each connected through linkage 37 to a front and a rear set of doors 38 and 39 respectively disposed in end-to-end relation and normally closing an opening in the underside of the nose section 11 through which the landing gear passes during protraction and retraction.

Two door sets 38 and 39 are preferred in order to maintain the landing gear opening in the nose section 11 to a minimum size. Between the linkage 37 associated with the front doors 38 and the rods 35 is an intermediate gear box 35' having a gear arrangement to effect movement of the front doors 38 to the opened and then closed position while the rear doors 39 are either being opened or closed. This allows a substantial portion of the opening in the nose section 11 to be closed by the front doors 38 after the landing gear has been fully protracted and retracted.

The door-operating mechanism just described as well as the doors 38 and 39 constitute an integral part of the nose section 11 at all times. When the nose section 11 is raised or opened, this operating mechanism is separated from the landing gear by means of and through a coupler 40 incorporated in the length of each shaft 33. This coupler 40 is preferably formed by complemental tapered spline elements 41 which automatically engage and disengage upon movement of the nose section 11 in the vertical plane as described.

In view of the foregoing construction and arrangement, the landing gear assembly in its retracted position during flight of the aircraft 10 is disposed entirely within the nose section 11 which is in the closed position presenting a smooth and clean aerodynamic configuration. When the landing gear is protracted prior to the landing operation, the strut 18 is rotated about the trunnion 19. The door-actuating mechanism is concurrently operated to open the doors 38 and 39. Due to the gear arrangement of box 35' associated with each front door 38 the doors 38 open to allow the passage of the landing gear therethrough, and thereafter close, while the aft doors 39 are simply moving from the closed to the fully opened position. When the landing gear has thus assumed the protracted position, the arm 23 will have moved vertically to a position in coaxial alignment with the strut 18 and downlock 31 will have engaged.

After the aircraft has landed and the taxiing operation is complete, on-and-off loading of the cargo compartment 13 may be accomplished by opening or raising the nose section 11 on and about its pivot 12. The door/ramp 14 may now be lowered swinging on its hinge 15 to the desired load level position. At this time, the landing gear constitutes an integral part of the door/ramp 14 and rotates in unison therewith being concurrently displaced to the rear.

Thereafter, when the on-and-off loading has been completed, the entire operation is reversed. Thus, the door/ramp 14 is raised concurrently moving the strut 18 and extension 23 to the vertical position. The nose section 11 is then lowered and the coupler 40 is engaged whereby the aircraft 10 is in taxiing and take off condition. When airborne, rotation of the trunnions 19 by operation of the cylinders 21 concurrently starts the retraction of the wheel 29 and the door-operating mechanism for the sequential movement of the doors 38 and 39. The opening in the nose section 11 for passage of the landing gear during protraction and retraction is thereby closed and the nose section 11 presents a clean aerodynamic configuration for normal horizontal flight.

While a particular embodiment of the invention has been illustrated and described, it is apparent that various changes and modifications thereof will suggest themselves to those skilled in the art. The appended claims are intended to cover all such modifications and equivalents as fairly fall within the true spirit and scope of the invention.

What is claimed is:

1. In an aircraft having an access opening therein to permit on-and-off loading of cargo therethrough and a removable closure for said opening during flight of the aircraft, the combination of a ramp carried by the aircraft and extensible and retractable through said opening when said closure is removed to facilitate said on-and-off loading, a landing gear to support said aircraft during ground operations, a hinge connecting said landing gear to said ramp for swinging movement independent thereof to and from a retracted position within the aircraft and a protracted position externally of the aircraft and for swinging movement in unison therewith upon extension and retraction of the ramp as aforesaid, a passage through said closure for said landing gear when the closure covers said access opening, at least one door adapted to close said passage during flight of the aircraft, and an operating mechanism connecting said landing gear and each said door for the synchronized movement thereof whereby each said door moves to the open position prior to protraction of the landing gear and to the closed position following retraction thereof.

2. The combination of claim 1 including two doors to close said passage during flight of the aircraft and wherein said operating mechanism includes linkage for the movement of one of said doors to the open and then closed position while the other of said doors is moving to either one of said positions.

3. The combination of claim 1 wherein said landing gear includes a shock strut and said hinge includes a trunnion beam adjacent the inner end of said strut, a rigid extension arm pivotally connected to the inner extremity of said strut, and a sliding connection between the other end of said arm and said ramp.

4. The combination of claim 2 wherein said linkage includes a coupler automatically engageable and disengageable by said closure upon movement thereof to and from its extreme positions relative to said access opening.

5. The combination of claim 3 including two sets of doors to close said passage during flight of the aircraft, said sets of doors being contiguously disposed on the underside of the aircraft, and wherein said operating mechanism includes a linkage interconnecting each end of said trunnion beam with one door of each of said two sets for the movement of all of said doors in unison with said trunnion beam, said linkages including gear arrangements for the movement of said doors in a predetermined sequence.

6. The combination of claim 5 wherein said predetermined sequence is the opening and then closing of one of the sets of doors while the other set of doors is moving to either the opened or closed position.

References Cited

UNITED STATES PATENTS 2,544,855 3/1951 Parker _____ 244—102
2,548,832 4/1951 Tydon _____ 244—101

OTHER REFERENCES

German printed application No. 1,182,963, December 1964.

MILTON BUCHLER, *Primary Examiner.*

PAUL E. SAUBERER, *Assistant Examiner.*